Oct. 27, 1931.  G. E. A. POHU  1,829,109
ELECTRIC CIRCUIT COUPLING DEVICE
Filed Feb. 2, 1928  3 Sheets-Sheet 1
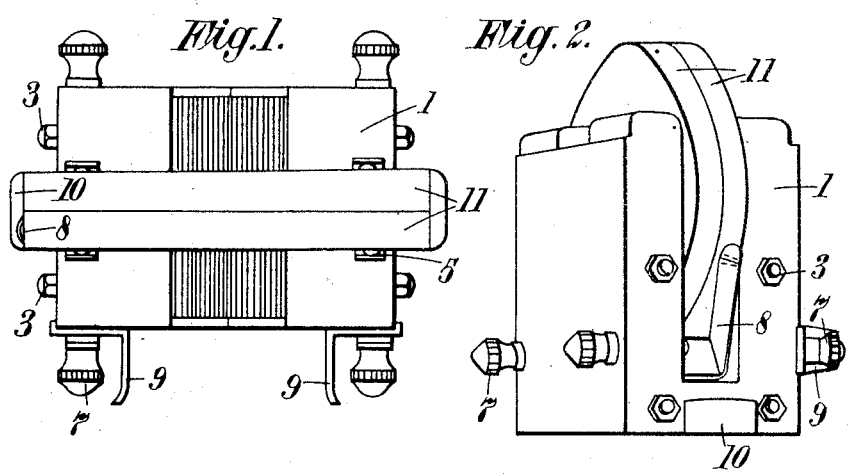
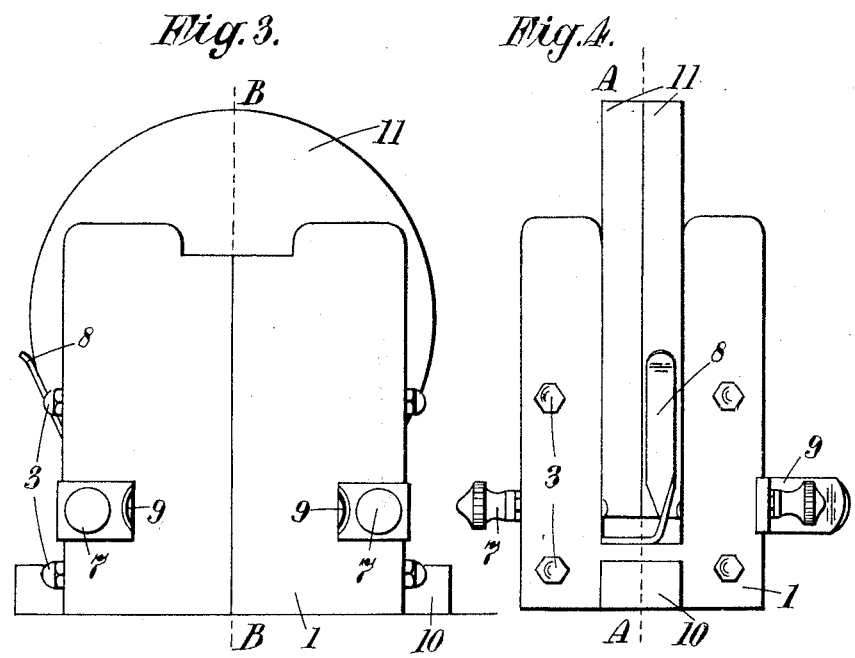
INVENTOR
Georges Edouard Armand Pohu
BY
Spear, Middleton, Donaldson & Hall
ATTORNEYS

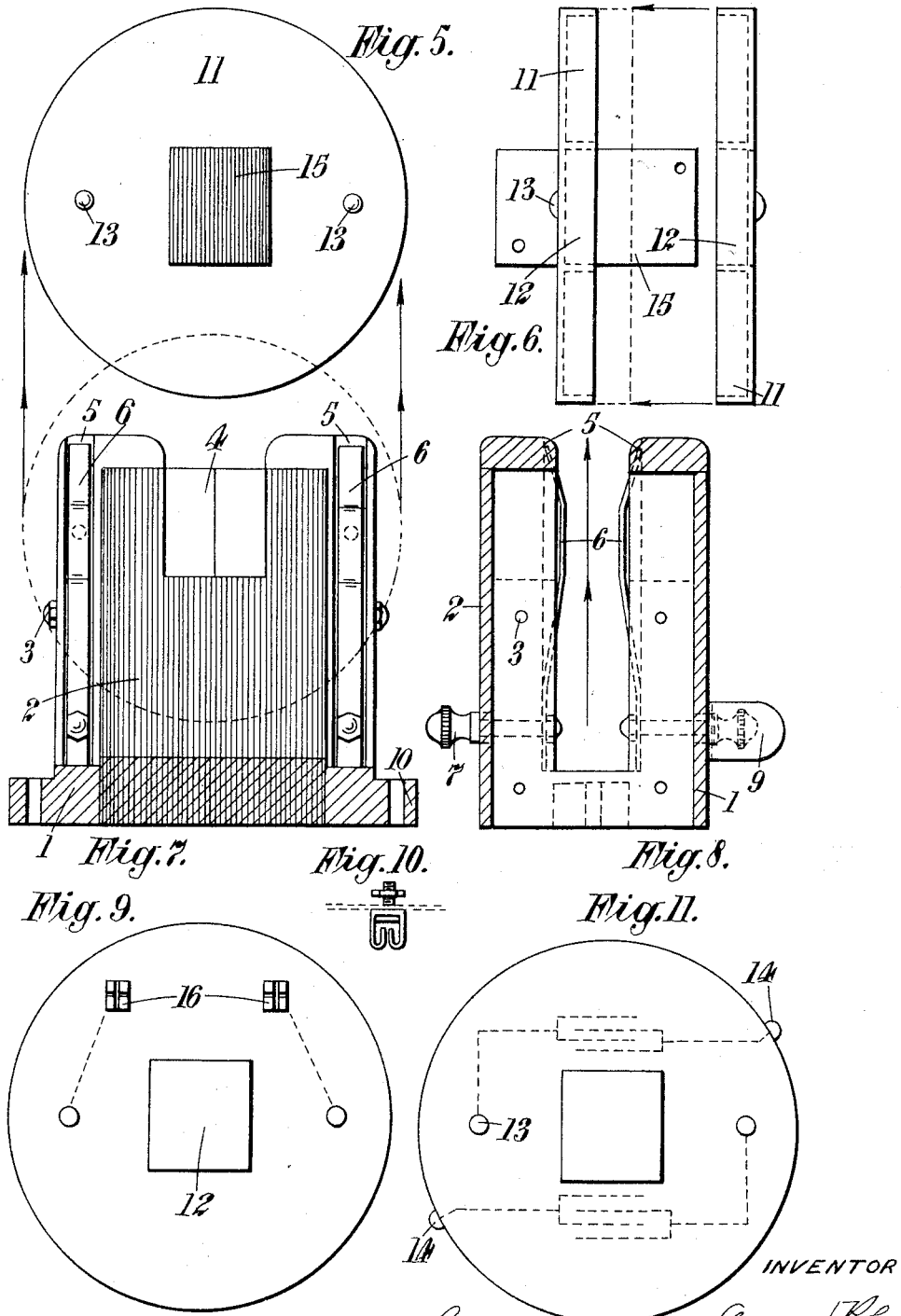

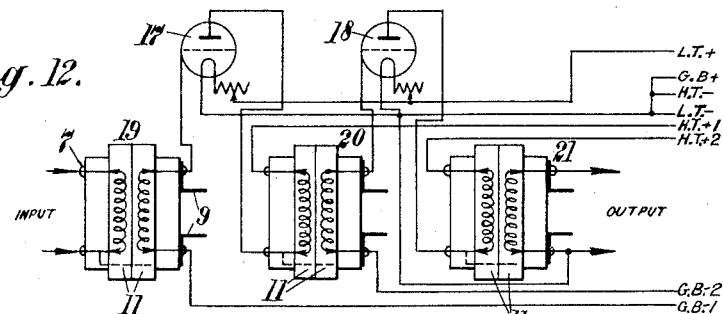
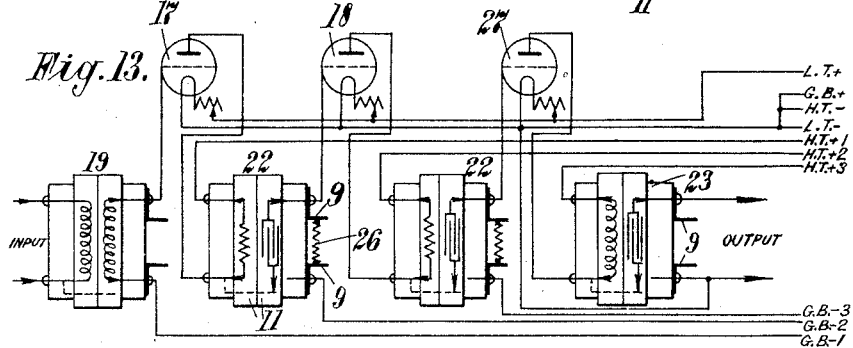
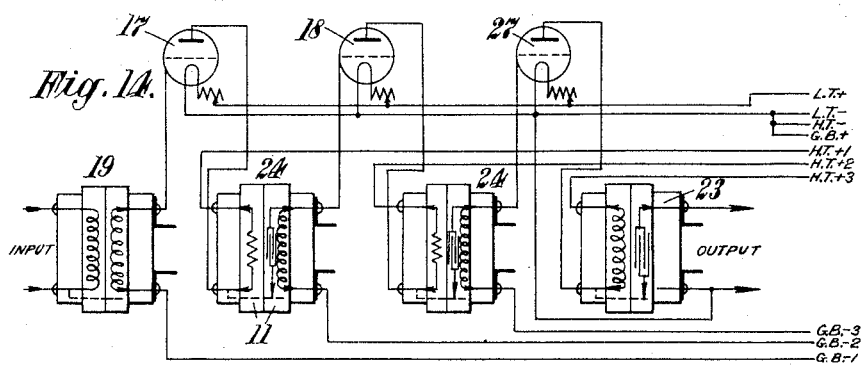
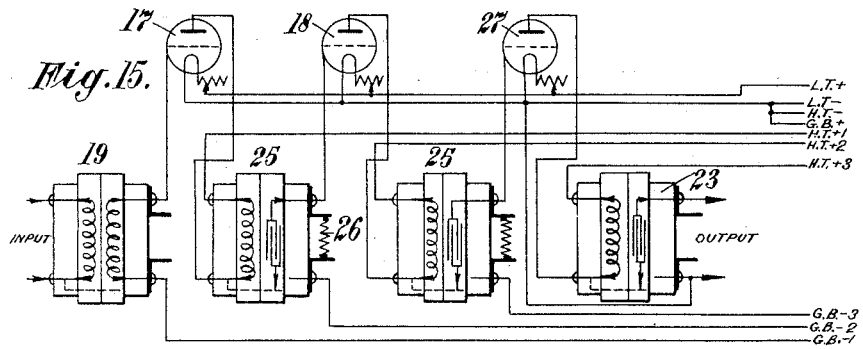

Patented Oct. 27, 1931

1,829,109

UNITED STATES PATENT OFFICE

GEORGES EDOUARD ARMAND POHU, OF LONDON, ENGLAND

ELECTRIC CIRCUIT COUPLING DEVICE

Application filed February 2, 1928, Serial No. 251,444, and in Great Britain February 2, 1927.

The invention relates to electric circuit coupling devices and has for its object to provide a coupling device by means of which the nature or degree of coupling between electric circuits may be readily and conveniently changed.

The electric circuit coupling device of the invention comprises a holder of magnetic material formed to receive coupling units of standard dimensions by the interchange of which the degree of coupling or coupling characteristic can be varied as desired. The holder is provided with electric conducting members for connection of the coupling units with the external circuit and the units contain windings, resistances, conductors, condensers of suitable values, or combinations of such elements, so that by the selection and combination of appropriate units the nature of the coupling may be made inductive, choke-capacity, resistance-capacity and the like.

Generally the holder and coupling units will be formed of such dimensions that the device is completed by the insertion of two units. When both these units comprise windings inductively arranged the device constitutes an electric transformer the ratio and characteristic of which can be readily varied by selection of appropriate units. By substituting other units the device can be changed quickly into a resistance-capacity coupler or a choke-capacity coupler.

Part of the magnetic holder is preferably movably arranged to permit of the ready exchange of units. Conveniently the movable part is a detachable bridging member which not only serves the purpose of aiding magnetic interlinkage between inductive windings when the coupling device is used as a transformer, but also aids in positioning the units correctly in the holder so that contact is made automatically between the unit and the remainder of the electric circuit.

The magnetic holder is preferably built up of laminations of magnetic material in a manner common to electrical transformers and is provided with external terminals for connection of the coupling device to the circuit and inner contacts for connection to the interchangeable coupling units. The inner contacts are preferably in the form of spring members adapted to cooperate with projections on the units.

The casings of the aforementioned interchangeable units are made preferably of insulating material and to standardized dimensions, and are adapted to accommodate the electrical element used in the coupling device, e. g. coils of wire inductively arranged, resistance wire, which may be non-inductively arranged, material acting as resistance, condensers of fixed or variable capacities and the like. Grid-leak resistances or choke-leak impedances may be incorporated. These units are provided with contact studs or the like to which the element therein is electrically connected, so that, when the units are inserted in the holder, the contact studs engage with the spring contact members attached thereto.

The aforementioned bridging member built up of laminations of magnetic material may be placed through the centre of the units in order to obtain a closed magnetic circuit. Clips or similar holding devices may also be provided on the holder which serve to carry, when required, a grid-leak.

Thus by inserting various units, the nature or degree of coupling may be changed without any alteration to the permanent wiring scheme of the circuit or circuits in which the device is incorporated. When working as a low frequency or intermediate frequency transformer it is possible to change such factors as impedance of windings (primary, secondary or both), ratio of turns, etc. Similarly, such factors as anode resistance, coupling capacity and grid-leak resistance are variable when the instrument is functioning as a resistance capacity unit.

In order that any instrument such as a telephone or an indicating or measuring instrument may be connected direct into the circuit normally embodying one or other of the interchangeable units, a blank unit may be made use of, the said unit being provided only with terminals and contact studs, each of the terminals being connected to one of the contact studs.

In order that the invention may be better understood, one example of construction and several examples of its application are described with reference to the accompanying drawings in which, Fig. 1 is a plan view,
Fig. 2 is a perspective view,
Fig. 3 is a side view, and
Fig. 4 is an end view of the device.
Fig. 5 is a side view of a coupling unit showing the bridging member in cross-section.
Fig. 6 is an end view showing two coupling units and the bridging member.
Fig. 7 is a sectional view on the line A—A of Fig. 4 omitting the interchangeable unit.
Fig. 8 is a sectional view on the line B—B of Fig. 3 omitting the interchangeable units.
Fig. 9 illustrates the blank unit.
Fig. 10 shows a fragmentary view of the terminals mounted in the blank unit.
Fig. 11 shows a form of condenser unit.
Fig. 12 shows a circuit arrangement of a two valve amplifier employing the device as a low frequency transformer.
Fig. 13 shows a suitable circuit arrangement employing the device as a low frequency transformer, resistance-capacity amplifier with grid-leak and choke output device.
Fig. 14 shows a similar circuit arrangement but employing a choke-leak in place of a grid-leak.
Fig. 15 shows a suitable circuit arrangement for a choke capacity amplifier.

Referring to the figures, the holder consists essentially of a casing 1 of insulating material made in two halves, such as a resinous condensation product, and of laminations 2 of magnetic iron, securely fixed within this casing, e. g. by tie rods 3. The laminations are insulated from one another and, preferably, tubes of insulating material cover the tie rods to insulate them from the laminations. When looking from the end the laminations are U-shaped (see Fig. 8), the limbs of the middle laminations being shorter than those at the outside, so that a recess 4 is formed in the middle, wherein a bridging core 15 may rest when a closed magnetic circuit is desired. The casing is recessed down its inner faces as at 5 (Figs. 1, 7 and 8) and therein are fitted four leaf springs 6 held securely at the ends by the four terminals 7. A further spring member 8 is shaped and fitted as shown best in Fig. 4, which is connected to one of the terminals 7. The purpose of this member will be seen later. Two clips 9 are secured under the two terminals on the side remote from that to which spring 8 is connected. In some cases they may be used to hold a grid-leak unit or a condenser. Alternatively clips may be provided on the primary side or on both sides for use when necessary for holding either resistances or condensers. The casing 1 is provided with lugs 10 having holes therein for fixing on a baseboard or panel.

The interchangeable units 11 are preferably of circular form and of uniform size. A hollow flanged casing, having a square hole 12 in the centre also flanged, contains the coils of wire, condenser plates or other elements, as desired, the other end being closed by any suitable insulating material, e. g. wax. The ends of the coils of wire are connected to the contact studs 13 projecting through the flat sides of the casing, so spaced as to engage with the spring members 6 when inserted in position in the holder. In the case of a condenser unit a contact stud 14 (Fig. 11) is provided on the rim of the casing adapted to engage with the spring contact member 8, whilst the other condenser lead is connected to a stud 13 on the flat side of the unit 11 so as to make connection with the other terminal 7. A rectangular laminated member 15 is adapted to fit through the square holes in the unit casings as shown in Figs. 5 and 6 and is of such a size that it may rest in the recesses 4 in the laminations 2 and projects across the limbs of same.

In order to assemble the device as a low frequency or intermediate frequency transformer two units with coils of wire, having a suitable number of turns are selected and mounted on the rectangular laminated member 15, the contact studs being on the outside as shown in Fig. 6. The units thus mounted are inserted in the holder so that the laminated member rests in the recesses provided. The contact studs then automatically make contact with the leaf springs 6 and the transformer is thus complete.

Some units are provided with resistance material or resistance wire wound non-inductively, for example wound from two wires connected together at their inner ends. Other units each contain a condenser or a single unit may have two independent condensers of different value as illustrated in Fig. 11, only that condenser being connected which makes contact through stud 14 to spring 8. To insert the other condenser involves rotating the unit through an angle of 180°. A suitable resistance unit on the input side and a condenser unit on the output side makes the device into a resistance-capacity coupler, whereas the substitution of a suitable inductive unit for the resistance unit converts the device into a choke-capacity coupler. In either case a grid leak may be arranged in the clips 9 or an inductive winding may be employed to provide, for example, resistance-capacity coupling with choke leak, a circuit arrangement which is known to have advantageous properties. The inductive units may range from 500 turns to 25000 turns, the non-inductive wire wound resistance units may range from 80,000 ohms to 400,000 ohms and the condenser units may have all usual capacities up to .01 microfarads. These examples are given of values which have proved useful but the invention is in no way limited to them.

Fig. 9 shows a form of blank unit which is used when it is desired to connect headphones, a loud speaker, a measuring or testing instrument in circuit. For this purpose the contact studs 13 are directly connected to spring terminals 16, one form of which is shown enlarged in Fig. 10.

The device is particularly suitable for use in radio receiving apparatus and the like for performing the function of low frequency transformers, resistance-capacity unit, choke capacity unit etc., whereby the advantages and disadvantages of these well-known methods of coupling valves may be easily compared, the changes from one form of coupling to another being simply effected. In addition the device can be used as a highly efficient intermediate frequency transformer, output transformer or output choke.

A few examples of the applications of the invention are shown in connection with the circuit diagrams of Figs. 12 to 15. Fig. 12 shows a two-valve amplifier for radio reception, for example, in which three coupling devices are employed. Two valves 17 and 18 are associated with three coupling devices as hereinbefore described 19, 20 and 21, each provided with two inductive units 11. The coupling devices act as transformers, the input being received on the primary of transformer 19, the secondary of which is connected to the grid of valve 17. From the anode circuit of this valve, the signals are received on the primary of transformer 20, the secondary of which is connected to the grid of valve 18, the anode of which is connected to the primary of transformer 21, the secondary of which may supply a loud speaker, for example. The details of the low tension, high tension and grid bias supply will be obvious from the diagram.

In Fig. 13 a similar input transformer 19 is employed, but instead of transformer amplification, resistance capacity amplification is used, preferably in two stages. It will be seen that each of the coupling devices 22 is provided on its input side with a non-inductive resistance and on its output side with a condenser which is connected between the anode of valve 17 or 18 and the grid of valve 18 or 27 respectively. In addition, a gridleak 26 is provided in the grid cathode circuits of valves 18 and 27. 23 is a coupling device in which on the input side there is provided an inductive winding connected in the anode circuit of the last valve 27 and on the output side there is a condenser connected to the anode of valve 27 so that the coupling device 23 acts as a choke output unit.

The circuit arrangement of Fig. 14 is similar in all respects to that of Fig. 13 except that in place of the condenser units with gridleaks 26 in the clips 9, a unit is employed on the output side of each of the coupling devices 24 consisting of a condenser and a choke leak winding.

Fig. 15 shows a circuit diagram practically indentical with Fig. 13, the only difference being that the resistance units on the input side of coupling device 22 are replaced in Fig. 15 by inductive units, so as to provide two stages 25 of choke capacity coupling.

When the coupling device is used for resistance capacity or choke capacity coupling, it is convenient to use the bridging member to hold the units in position, although without it the units are held less securely by the engagement of the contact studs 13 in the recesses 5. For inductive coupling the bridging member of magnetic material should be used because it is required to diminish the reluctance of the magnetic circuit.

Besides being able to fulfill a variety of functions, the device is not restricted in any of its electrical characteristics, whatever function it is performing, e. g. when working as a choke-capacity unit, it is possible to change such factors as inductance, coupling capacity and grid-leak resistance. It also has the advantage that should a winding break down (as windings are apt to do in the case of transformers or chokes) replacement is easily, cheaply and quickly effected. The device simplifies the construction of radio apparatus, inasmuch as a receiver can be wired up without regard to polarity of transformer windings since any undesirable interaction resulting from incorrect polarity can be remedied subsequent to wiring up merely reverseing a unit or units. Also by changing one or other of the coils the degree and uniformity of magnification can be varied and hence the volume and tone of sound emitted by the telephone or loud speaking instrument may be easily controlled. Two receivers wired to the same circuit arrangement, as, for example, in mass-production methods can be made to give widely different tonal and volume effects; this is a useful asset in order to satisfy the idiosyncrasies of a purchaser.

A variety of other uses will be apparent to the technical man. For the non-technical, a wide field of utility exists since the tonal qualities of a receiver can be improved by "trial and error" method.

Although particularly suitable for wireless receiving apparatus, the device may also be used in other branches of electrical engineering, for when built up as a transformer of suitable dimensions, it can be used for transforming voltages in power work e. g. for operating domestic appliances, such as irons, electric bells, dust suction devices etc. It has other useful applications in connection with amplifying microphone currents in radio telephonic transmitters, current generated by a pick-up device for gramophone reproduction, currents obtained from a kinematograph film with a sound record on it and also for television apparatus, line telephone work, signal shaping amplifiers for submarine cable work, etc.

The device may also be constructed of suitable dimensions to constitute an instrument transformer. Thus it may be employed for supplying switchboard instruments, such as ammeters and voltmeters. It may also be employed as a small supply transformer, for example, for supplying electric current in physical laboratories, where it may be desirable to change the ratio easily. In some cases three or more units of the appropriate dimensions may be provided on the magnetic core or holder, for example, in the case of a regulating transformer.

The invention is not limited to the form of device described and includes other modifications, e. g. the units may be square instead of circular and may carry additional contact studs, etc. The limbs of the transformer may be adapted to accommodate, as already mentioned, more than two units between them, and the units may be of entirely different dimensions. Likewise, the magnetic core need not necessarily consist of laminated members but may be formed of iron wire, filings or other suitable magnetic material.

I claim:—

1. In an electric circuit coupling device, the combination of a holder having a recess therein, terminals on said holder, contacts on walls of said recess, connected to said terminals, and a plurality of coupling units adapted to be removably inserted side by side within said recess and carrying contact means adapted to engage with said holder contacts, said units containing electric devices of desired characteristics so chosen as to constitute together a complete coupling device.

2. In an electric circuit coupling device, the combination of a holder having a recess with parallel sides therein, terminals on said holder, contacts on opposite sides of said recess, connected to said terminals, and a pair of interchangeable coupling units of like shape and size, having flat sides, adapted to be removably inserted side by side within said recess and carrying contact means adapted to engage with said holder contacts, said units containing electric devices of desired characteristics so chosen as to constitute together a complete coupling device.

3. An electric circuit coupling device, comprising magnetic holding means, and means formed to be interchangebly and removably inserted therein, in pairs of similarly shaped units, to complete, with said holding means, at will, a coupling of inductive, capacitative, resistance, or other desired character the coupling devices of one unit being complementary to those of the other unit, to constitute together a complete coupling device, and said holding means being arranged to serve as a magnetic core when suitable units are inserted therein to complete therewith an inductive coupling.

4. An electric circuit coupling device, comprising a holder formed to removably and interchangeably receive pairs of coupling units of standard dimensions, containing coils, condensers, resistances, and the like, so that by the selection, in pairs, of appropriate units the nature and characteristics of coupling can be readily varied at will, and a pair of such units, said holder having contact means adapted to be connected to the external circuit and said units having contact means connected to the coupling elements thereof and adapted to engage with said holder contact means, when the units are inserted in the holder.

5. In an electric circuit coupling device, the combination of a U shaped holder of magnetic material, terminals on said holder, contacts on inner surfaces of said holder, connected to said terminals, and a plurality of coupling units adapted to be removably inserted side by side between the limbs of said holder and carrying contact means adapted to engage with said holder contacts, said units containing electric devices of desired characteristics so chosen as to constitute together a complete coupling device, and said holder contacts being positioned to engage the contact means of different coupling units of similar shape, whereby different units having various inductive or other electrical characteristics may be placed successively in circuit in a given holder.

6. In an electric circuit coupling device, the combination of a U shaped holder, of magnetic material, terminals on said holder, contacts on inner surfaces of such holder, connected to said terminals, a plurality of coupling units adapted to be removably inserted side by side between the limbs of said holder and carrying contact means adapted to engage with said holder contacts, said units containing electric devices of desired characteristics so chosen as to constitute together a complete coupling device, said units having openings therethrough, and a separate member of magnetic material extending through said openings and mounted upon said holder to complete a magnetic circuit therewith.

7. In an electric circuit coupling device, a coupling receptacle comprising a U shaped holder of magnetic material, an insulating casing enclosing said material, terminals on said casing, and contacts on the inner sides of the limbs of said casing, electrically connected to said terminals, adapted to engage contacts on the outer surfaces of interchangeable coupling units when the same are inserted between the limbs of the holder.

8. In an electric circuit coupling device, a coupling receptacle comprising a plurality of U shaped magnetic iron laminations secured together, an insulating casing enclosing said laminations to form a U shaped holder, contacts on the inner sides of the limbs of said casing, adapted to be connected to the external circuit, and adapted to engage contacts on the outer surfaces of interchangeable coupling units when the same are inserted between the limbs of the holder, the upper ends of the limbs of the iron laminations being recessed to receive the ends of a bridging core when desired.

9. In an electric circuit coupling device, a coupling receptacle comprising a U shaped holder of magnetic material, an insulating casing enclosing said material, terminals on said casing, spring contacts on the inner sides of the limbs of said casing, connected to said terminals, adapted to engage contacts on the sides of interchangeable coupling units when the same are inserted between the limbs of the holder, and a contact member connected to one of said terminals, positioned to engage a contact on the edge of one of said coupling units, when inserted.

10. In an electric circuit coupling device, the combination of a holder of magnetic material, having exterior terminals and interior contacts connected therewith, and means formed to be interchangeably and removably inserted in said holder, in pairs of units, adjacent to each other, to complete, with said holder, an inductive coupling, each unit containing one inductive winding and carrying contact members to which said winding is connected, adapted to engage with a pair of said holder contacts, said holder being arranged to serve as a magnetic core for the coupling device.

In testimony whereof I have hereunto affixed my signature.

GEORGES EDOUARD ARMAND POHU.